(12) United States Patent
Modani et al.

(10) Patent No.: US 7,610,514 B2
(45) Date of Patent: Oct. 27, 2009

(54) IDENTIFICATION OF UNINFORMATIVE FUNCTION NAMES IN CALL-STACK TRACES

(75) Inventors: Natwar Modani, New Delhi (IN); Rajeev Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 11/428,751

(22) Filed: Jul. 5, 2006

(65) Prior Publication Data

US 2008/0010526 A1    Jan. 10, 2008

(51) Int. Cl.
G06F 11/00    (2006.01)
(52) U.S. Cl. .............................. 714/38; 714/39; 714/40; 714/41; 714/45; 717/128; 717/130; 717/133
(58) Field of Classification Search .................... 714/45, 714/39, 40, 41; 717/130, 128, 133
See application file for complete search history.

(56) References Cited

U.S. PATENT DOCUMENTS

| | | | | | |
|---|---|---|---|---|---|
| 4,905,204 | A | * | 2/1990 | Hughes | 367/62 |
| 5,408,650 | A | * | 4/1995 | Arsenault | 717/124 |
| 5,450,575 | A | * | 9/1995 | Sites | 717/128 |
| 5,928,369 | A | | 7/1999 | Keyser et al. | |
| 6,604,210 | B1 | * | 8/2003 | Alexander et al. | 714/39 |
| 6,678,883 | B1 | * | 1/2004 | Berry et al. | 717/128 |
| 6,751,789 | B1 | * | 6/2004 | Berry et al. | 717/130 |
| 2004/0237003 | A1 | * | 11/2004 | Adkisson | 714/47 |
| 2005/0028145 | A1 | | 2/2005 | Kang et al. | |
| 2005/0257086 | A1 | | 11/2005 | Triou, Jr. et al. | |
| 2007/0150871 | A1 | * | 6/2007 | Barsness et al. | 717/128 |
| 2007/0283338 | A1 | * | 12/2007 | Gupta et al. | 717/154 |

OTHER PUBLICATIONS

Perterson, (Math Weighted averages), Nov. 3, 1998, 1-4.*

* cited by examiner

*Primary Examiner*—Robert Beausoliel
*Assistant Examiner*—Jeison C Arcos
(74) *Attorney, Agent, or Firm*—Gibb I.P. Law Firm, LLC

(57) ABSTRACT

A method for identifying names of uninformative functions in call-stack traces is described. The method comprises the steps of obtaining a set of call-stacks and information indicative of which call-stack traces in the set match a particular call-stack trace; for each matching call-stack trace pair, incrementing a false negative counter for each function name above a first matching function name in a respective call-stack trace pair; for each non-matching call-stack trace pair, incrementing a false positive counter for each function name above a first non-matching function name in a respective call-stack pair; incrementing a frequency counter for each function name appearing in each of the call-stack traces; calculating an aggregate value for each of the function names as a function of respective ones of the false positive counter, the false negative counter and the frequency counter; and identifying uninformative ones of the function names based on the respective aggregate values. The method may be used to diagnose software problems based on known software problems and is useful in helpdesk and autonomic computing applications. A system and a computer program product for performing the method are also described.

23 Claims, 6 Drawing Sheets

IDENTIFICATION OF UNINFORMATIVE FUNCTION NAMES IN CALL-STACK TRACES

FIELD OF THE INVENTION

The present invention relates to computer software maintenance and more particularly to diagnosis of software problems or failures.

BACKGROUND

More than half of all software failures are thought to be re-occurrences of known problems. While such a statistic might appear encouraging, discovering whether a reported problem is a known problem is nevertheless time consuming. Such diagnosis is usually manually performed by skilled software support staff and is thus expensive. A need thus exists for automated methods and systems for discovering similarities in reported software problems.

Inferring relationships from natural language descriptions of problem reports is a challenging problem. However, problem reports generated by software components frequently contain structured diagnostic information, which is more useful for automated matching than semi-structured or unstructured symptom descriptions provided by humans. Call-stack traces are the most prevalent type of information collected by software systems for post-failure diagnosis, for example, when a system 'hangs' or 'crashes'. A function name is pushed each time the function is called and popped each time the function returns. Call-stacks may thus be used to reconstruct the sequence of function calls leading up to a failure.

Stack trace matching is a useful way of identifying repeat occurrences of a software problem, particularly hard failures leading to a system crash. Normalization of stack traces prior to matching provides improved match results. Two ingredients of normalization are: (1) removal of function names from the stack that do not provide information about the nature of the problem or failure, and (2) removal of recursive function calls from the stack.

Identification of function names of error handling routines is important in stack trace matching. This is analogous to stop word removal in the information retrieval domain. In document matching, stop words only increase complexity and may decrease classification accuracy to a small extent. However, identification of function names of error handling routines in stack trace matching can greatly affect the quality of the matching results.

Existing approaches for identifying such function names include: (1) provision of a list of such function names by a domain expert, and (2) assuming that frequently appearing functions are uninformative. The second approach is based on the frequency based statistical method commonly used in the information retrieval domain. However, both approaches have distinct disadvantages. The first is expensive on account of requiring human effort. Some disadvantages of the second approach include:

a large corpus of documents is required to provide reliable results, if the document class distribution is non-uniform, a wrong set of function names may be identified as uninformative (for example, if software component a is experiencing more problems than software component b, then the function names appearing in call-stacks of software component a are more likely to be identified as uninformative, even if those function names are informative), and the frequency threshold above which a word is considered a stop-word is ad-hoc and does not have an objective foundation.

U.S. Patent Publication No. 20050028145, assigned by the inventors Amy H. Kang et al. to Sun Microsystems Inc. and published on Feb. 3, 2005, relates to a flexible error trace mechanism that records trace elements to identify errors. The errors may be debugged using information in the error trace elements. In particular, instrument software and libraries are disclosed for generating a stack that is helpful in identifying the root cause of the problem, even when the default error messages may not be very useful for identifying the root cause of the problem. However, identification of an error handling routine from a collection of call stack traces is not disclosed.

U.S. Pat. No. 5,928,369 issued to Keyser et al. on Jul. 27, 1999 and assigned to Synopsis, Inc., relates to an automatic support system and method which compare a user submitted stack trace to a reference stack trace associated with a known system error. However, identification of uninformative function names in call-stack traces is not disclosed.

U.S. Patent Publication No. 20050257086, assigned by the inventors Edward Triou JR et al. to Microsoft Corporation and published on Nov. 17, 2005, relates to systems and methods for automated classification and analysis of large volumes of test result data. The classification may be based on call-stack traces. However, identification of uninformative function names in call-stack traces is not disclosed.

None of the foregoing documents appear to disclose a method or system for identifying uninformative function names in call-stack traces, as described hereinafter.

SUMMARY

Aspects of the present invention relate to methods, systems and computer program products for identifying uninformative function names in call-stack traces.

An aspect of the present invention provides a method for identifying names of uninformative functions in call-stack traces. The method comprises the steps of obtaining a set of call-stacks and information indicative of which call-stack traces in the set match a particular call-stack trace; for each matching call-stack trace pair, incrementing a false negative counter for each function name above a first matching function name in a respective call-stack trace pair; for each non-matching call-stack trace pair, incrementing a false positive counter for each function name above a first non-matching function name in a respective call-stack pair; incrementing a frequency counter for each function name appearing in each of the call-stack traces; calculating an aggregate value for each of the function names as a function of respective ones of the false positive counter, the false negative counter and the frequency counter; and identifying uninformative ones of the function names based on the respective aggregate values.

The uninformative function names may be identified based on a threshold value or on a comparison of the calculated aggregate values.

The set of call-stack traces and information indicative of which call-stack traces in the set match a particular call-stack trace may be obtained from a repository of known software problems.

Call-stack traces in a matching call-stack trace pair both relate to a common software problem, whereas call-stack traces in a non-matching call-stack trace pair relate to different software problems.

The method may include the further steps of incrementing the false positive counter for each function name in a pair of identical call-stack traces and/or incrementing the false negative counter for each function name in a pair of call-stack traces that have no matching function names.

Another aspect of the present invention provides a system for identifying names of uninformative functions in call-stack traces. The system comprises a repository for storing call-stack traces relating to known software problems and a computer system coupled to the repository. The computer system comprises a memory unit for storing data and instructions to be performed by a processing unit and a processing unit coupled to the memory unit. The processing unit is programmed to execute the steps of the above method.

Yet another aspect of the present invention provides a computer program product comprising a computer readable medium comprising a computer program recorded therein for identifying names of uninformative functions in call-stack traces described herein. The computer program product comprises computer program code for executing the steps of the above method.

BRIEF DESCRIPTION OF THE DRAWINGS

A small number of embodiments are described hereinafter, by way of example only, with reference to the accompanying drawings in which.

DETAILED DESCRIPTION

Embodiments of systems, methods, and computer program products are described hereinafter for identifying uninformative function names in call-stack traces. The embodiments described hereinafter have application in the field of computer software maintenance. Examples of such applications include, but are not limited to, help-desk scenarios and autonomic systems. The aim of autonomic systems is to remove the need for human intervention in system management. Desirable attributes of autonomic systems include self-healing and automatic identification of known problems. It is advantageous that false positives are minimized in such systems.

Figure 1:
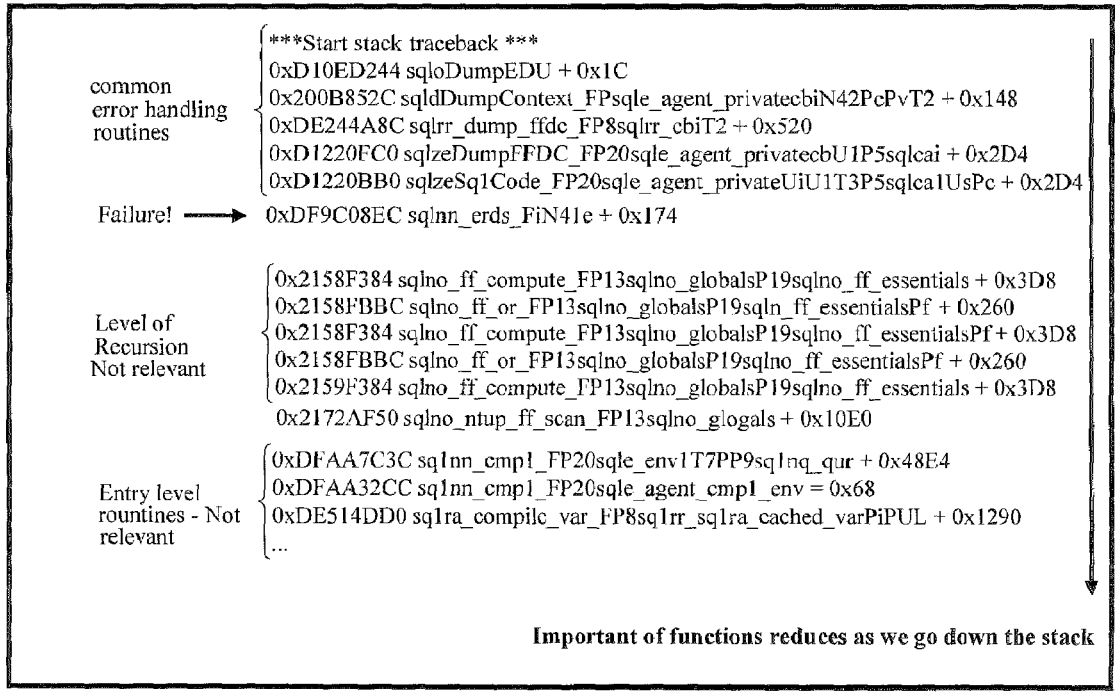
FIG. 1 is a C++ generated call-stack trace.

FIG. 1 shows an example of a C++ call-stack trace generated by IBM's DB2 relational database management system. Each line in the call-stack trace relates to a separate function and begins with a hexadecimal number denoting the particular function's address in memory. The address is followed by the function's name separated by two underscores from the C++ "mangled" names of the arguments of the function and the offset of the instruction from the start of the function. The name of the deepest function in the call flow is at the top of the call-stack, whereas the entry point function name is at the bottom of the call-stack.

The top five functions in the call-stack are error handling routines, which are invoked when an error or exception is detected. As such, these functions do not provide information about the nature of the problem and are thus uninformative functions.

On the other hand, the bottom of the call-stack is the entry point, which is common across a large number of stacks. The last 3 functions in the call-stack are entry level routines, which also do not provide useful information about the nature of the problem and are thus uninformative functions.

Furthermore, there may be recursive calls to some functions in the call-stack. However, if a function appears multiple times in the call-stack then whatever occurs between two calls to that function may not be useful for determining the nature of the problem.

Hence, removal of uninformative function names and recursive function calls before matching call-stacks is advantageous. This process is referred to as normalizing the call-stack traces.

Figure 2:
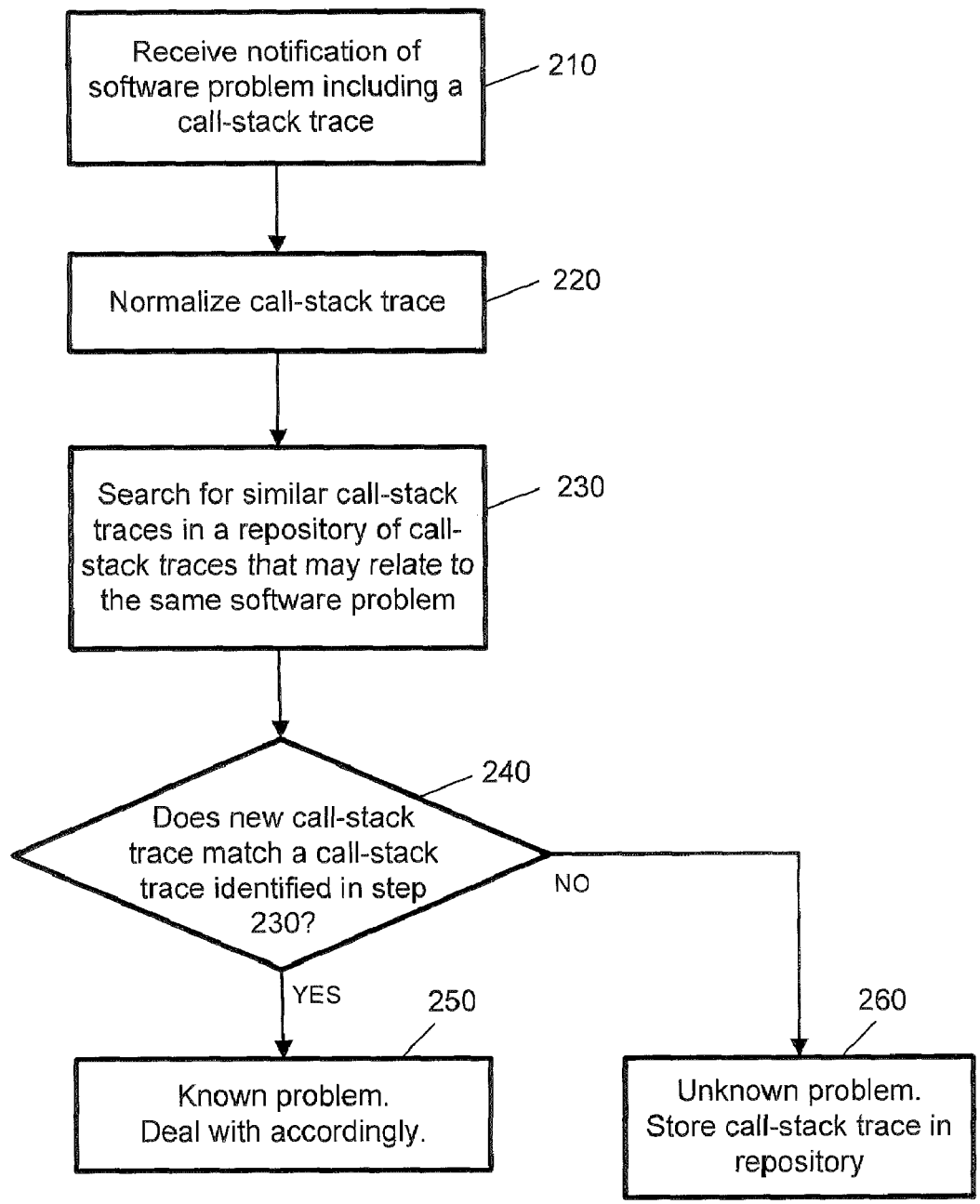
FIG. 2 is a flow diagram of a method for matching call-stack traces to identify known computer software problems.

FIG. 2 is a flow diagram of a method for matching call-stack traces to identify known computer software problems. Embodiments described herein for identifying uninformative function names in call-stack traces may be practiced in conjunction with the method of FIG. 2.

Referring to FIG. 2, a new notification of a software problem is received at step 210. The text of the notification comprises at least one call-stack trace.

At step 220, the received call-stack trace is normalized (parsed) to remove uninformative function names and recursion.

At step 230, the normalized call-stack trace is used to search for similar call-stack traces stored in a call-stack trace repository that may relate to the same software problem. Since the number of call-stack traces stored in the repository may be large, indices are created and used to search more efficiently. Typically, a number of similar call-stack traces retrieved from the repository based on an index are ranked by a matching algorithm. The most similar traces or a fixed number of traces may be selected based on a threshold.

At step 240, a determination is made whether the call-stack trace relating to the newly identified problem matches one of the call-stack traces selected in step 230 that relates to a known problem. If so (YES), the newly identified problem is a known problem and is dealt with accordingly at step 250. If not (NO), the newly identified problem is not a known problem and is stored in the call-stack repository in step 260 for use in future diagnosis.

As discussed hereinbefore, the functions at the top of a call-stack may be uninformative and, if not removed, can degrade the performance of call-stack trace matching algorithms. The reasons are twofold. Firstly, functions within a software module tend to use the same error handling routines and hence, if the matching algorithm gives higher weight to the top of the call-stack, this would lead to an increased number of false positives. Secondly, although the functional code may not change, the error handling routines may change from one software version to another. This means that even though the function where the problem is encountered may not change, the top of the call-stack may change, thus leading to an increased amount of false negatives. The foregoing reasons strongly suggest that removal of such error handling routine or function names is an important and beneficial pre-processing step for call-stack trace matching. Identification of uninformative function names for removal may be performed using the method described hereinafter with reference to FIG. 3.

Figure 3:
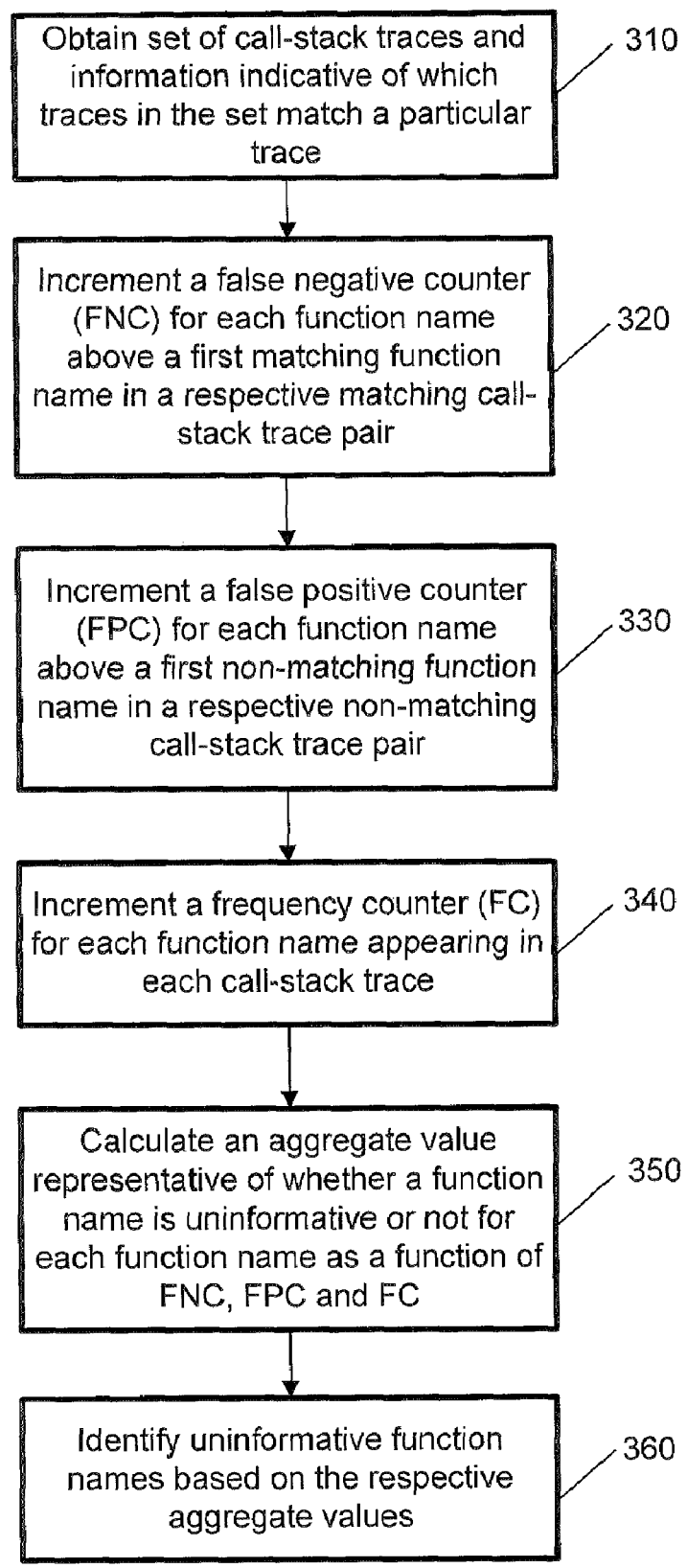
FIG. 3 is a flow diagram of a method for identifying uninformative function names in call-stack traces in accordance with an embodiment of the present invention.

FIG. 3 is a flow diagram of a method for identifying uninformative function names in call-stack traces. The method of FIG. 3 comprises a supervised learning method, which is capable of detecting uninformative function names more quickly and efficiently than previously known methods such as the document frequency based statistical approach commonly used in the information retrieval arena.

Referring to FIG. 3, a set of call-stack traces and information indicative of which call-stack traces in the set match a particular call-stack trace are obtained, at step 310. The call-stack traces may be retrieved from a repository of call-stack traces.

At step 320, a false negative counter (FNC) is incremented for each function name above a first matching function name in a respective matching call-stack trace pair. If call-stack trace pair has no matching function names, the false negative counter (FNC) is incremented for each function name in that pair of call-stack traces.

At step 330, a false positive counter (FPC) is incremented for each (matching) function name above a first non-matching function name in a respective non-matching call-stack trace pair. If a call-stack trace pair is identical, the false positive counter (FPC) is incremented for each function name in that pair of call-stack traces.

Steps 320 and 330 are repeated for each pair of call-stack traces in the set. A matching call-stack trace pair relate to a common software problem, whereas a non-matching call-stack trace pair relate to different software problems.

At step 340, a frequency counter (FC) is incremented for each function name appearing in the call-stack traces.

At step 350, an aggregate value for each of the function names is calculated as a function of the false positive counter (FPC), the false negative counter (FNC) and the frequency counter (FC) for the respective function name. The aggregated values are representative of whether the respective function names are uninformative or not and may comprise probability values.

At step 360, uninformative function names are identified based on the respective calculated aggregate values.

One method for identifying the uninformative function names based on the calculated aggregate values is by comparing these values to a threshold. Function names with aggregate values higher than the threshold are identified as uninformative. However, numerous other methods for identifying the uninformative names may alternatively be practiced. For example, a fixed number of uninformative function names may be identified based on a comparison of the calculated aggregate values.

Numerous alternative methods may be practiced to calculate the aggregate values. In one particular embodiment, an aggregate value for a particular function name is calculated in accordance with the formulae:

$$F_f = w_1 * FPC_f + w_2 * FNC_f + w_3 * FC_f$$

where:
$FPC_f$ is the false positive counter for the particular function name;
$FNC_f$ is the false negative counter for the particular function name; and
$FC_f$ is the frequency counter for the particular function name; and
$w_1$, $w_2$, and $w_3$ are weight values.

Numerous alternative methods may be practiced to determine the weight values. For example, the weight values may be determined in accordance with a system cost of a false positive compared to a system cost of a false negative. In one embodiment, the weight values are determined in accordance with the formulae:

$$w_1 = 1/\text{SUM}(FPC);$$

$$w_2 = 1/\text{SUM}(FNC); \text{ and}$$

$$w_3 = 1/\text{SUM}(FC).$$

In another embodiment, the weight values are determined in accordance with the formulae:

$$w_1 = 1/FPC_{max};$$

$$w_2 = 1/FNC_{max}; \text{ and}$$

$$w_3 = 1/FC_{max}.$$

In the method described hereinbefore with reference to FIG. 3, three variables (FPC, FNC and FC) are maintained for each function name appearing in the call-stack traces. In another embodiment, the three variables are maintained only for functions appearing in the call-stack traces more than a certain number of times. This value may comprise a fixed threshold. The variables are initialized to zero before the method begins.

Figure 4A:
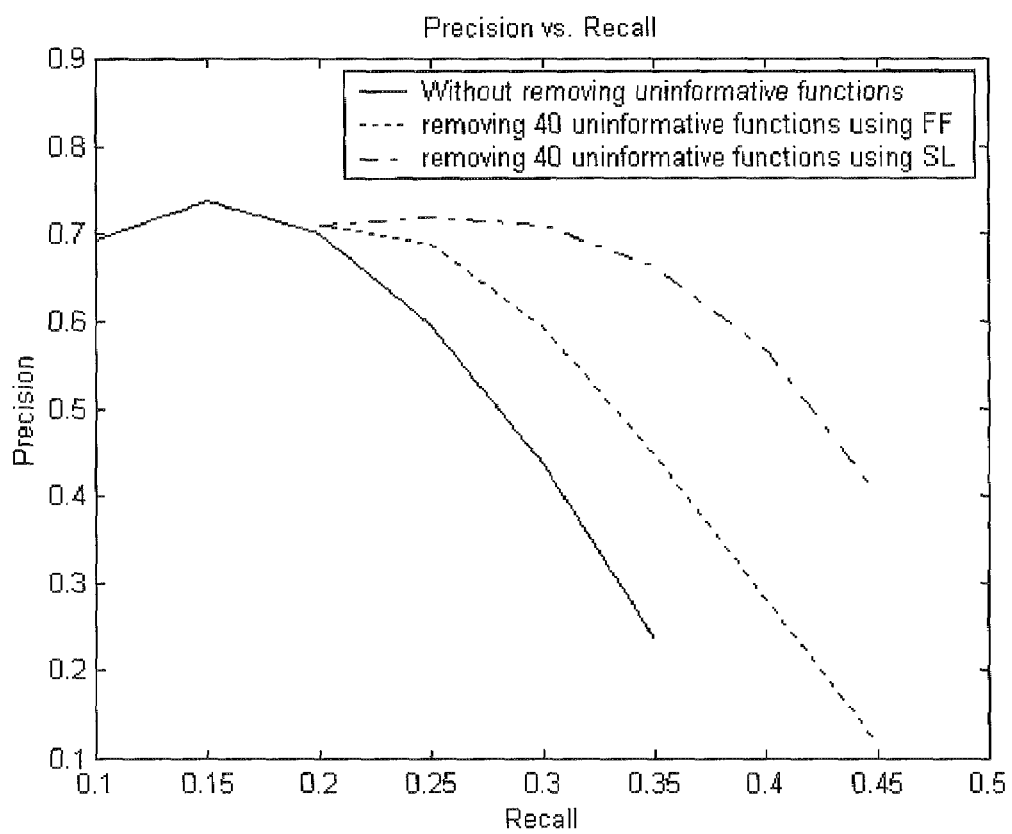
FIGS. 4a and 4b are graphs showing results of call-stack trace matching methods with and without removal of uninformative function names.
Figure 4B:
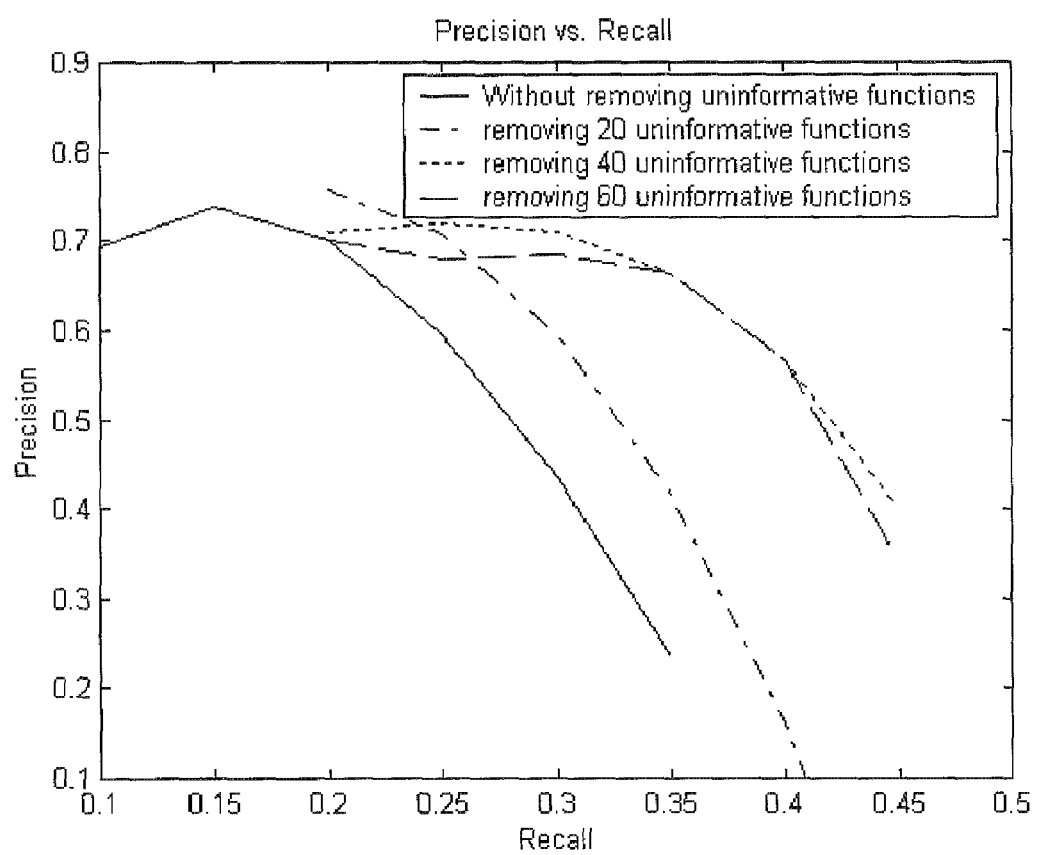

FIGS. 4a and 4b are graphs showing results of call-stack trace matching methods with and without removal of uninformative function names.

FIG. 4a shows precision as a function of recall for: (1) call-stack trace matching without removal of uninformative function names, (2) call-stack trace matching with removal of 40 uninformative function names using the frequency based statistical method, and (3) call-stack trace matching with removal of 40 uninformative function names using the supervised learning method of an embodiment of the present invention. As may be seen from FIG. 4a, removal of uninformative function names from the top of the call-stack traces results in improved precision and recall when using either the frequency based statistical method or the supervised learning method of an embodiment of the present invention. However, the supervised learning method for uninformative function name removal performs considerably better than the frequency based statistical method.

FIG. 4b shows precision as a function of recall for: (1) call-stack trace matching without removal of uninformative function names, (2) call-stack trace matching with removal of 20 uninformative function names using the self learning method of an embodiment of the present invention, (3) call-stack trace matching with removal of 40 uninformative function names using the self learning method of an embodiment of the present invention, and (4) call-stack trace matching with removal of 60 uninformative function names using the self learning method of an embodiment of the present invention. As may be seen from FIG. 4b, removal of progressively more uninformative function names from the top of the call-stack traces results in improved precision and recall until 40 uninformative function names are removed. However, no improvement is evident when 60 uninformative function names are removed. This is due to the fact that as more function names are removed, more distinguishing function names are assumed to be uninformative and are removed, thus resulting in a reduction in precision. In general, uninformative function name removal increases recall, however, recall may reduce if large numbers of function names are removed from short stacks.

Figure 5:
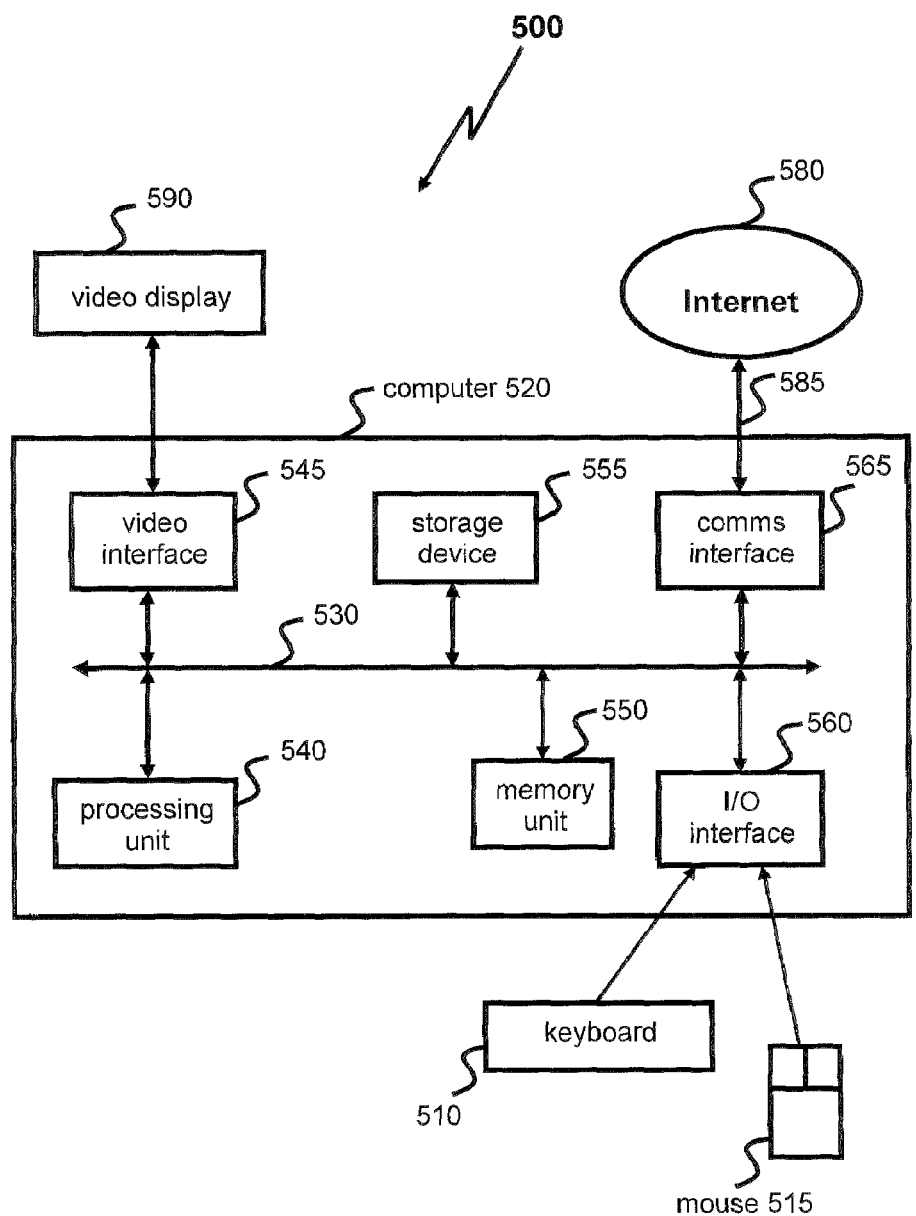
FIG. 5 is a schematic block diagram of a computer system with which embodiments of the present invention may be practised.

FIG. 5 shows a schematic block diagram of a computer system 500 that can be used to practice the methods described herein. More specifically, the computer system 500 is provided for executing computer software that is programmed to assist in performing a method for identifying uninformative function names in call-stack traces. The computer software typically executes under an operating system such as MS Windows 2000, MS Windows XP™ or Linux™ installed on the computer system 500.

The computer software involves a set of programmed logic instructions that may be executed by the computer system 500 for instructing the computer system 500 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code, that perform particular steps of the methods described hereinbefore.

The components of the computer system 500 comprise: a computer 520, input devices 510, 515 and a video display 590. The computer 520 comprises: a processing unit 540, a memory unit 550, an input/output (I/O) interface 560, a communications interface 565, a video interface 545, and a storage device 555. The computer 520 may comprise more than one of any of the foregoing units, interfaces, and devices.

The processing unit 540 may comprise one or more processors that execute the operating system and the computer software executing under the operating system. The memory unit 550 may comprise random access memory (RAM), read-only memory (ROM), flash memory and/or any other type of memory known in the art for use under direction of the processing unit 540.

The video interface 545 is connected to the video display 590 and provides video signals for display on the video display 590. User input to operate the computer 520 is provided via the input devices 510 and 515, comprising a keyboard and a mouse, respectively. The storage device 555 may comprise a disk drive or any other suitable non-volatile storage medium. The storage device 555 may be used as a repository for storing call-stack traces relating to known software problems.

Each of the components of the computer 520 is connected to a bus 530 that comprises data, address, and control buses, to allow the components to communicate with each other via the bus 530.

The computer system 500 may be connected to one or more other similar computers via the communications interface 565 using a communication channel 585 to a network 580, represented as the Internet.

The computer software program may be provided as a computer program product, and recorded on a portable storage medium. In this case, the computer software program is accessible by the computer system 500 from the storage device 555. Alternatively, the computer software may be accessible directly from the network 580 by the computer 520. In either case, a user can interact with the computer system 500 using the keyboard 510 and mouse 515 to operate the programmed computer software executing on the computer 520.

The computer system 500 has been described for illustrative purposes. Accordingly, the foregoing description relates to an example of a particular type of computer system such as a personal computer (PC) or workstation, which is suitable for practicing the methods and computer program products described hereinbefore.

Those skilled in the computer programming arts would readily appreciate that alternative configurations or types of computer systems may be used to practice the methods and computer program products described hereinbefore.

Embodiments of methods, systems, and computer program products have been described hereinbefore for identifying names of uninformative functions in call-stack traces. The embodiments described hereinbefore advantageously do not require the assistance of a domain expert or the software developer/s to identify such uninformative functions.

The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless explicitly stated to the contrary.

We claim:

1. A computer-implemented method for identifying names of uninformative functions in call-stack traces, said method comprising the steps of:

using said computer, obtaining a set of call-stacks and information indicative of which call-stack traces in said set match a particular call-stack trace;

using said computer, for each matching call-stack trace pair, incrementing a false negative counter for each function name above a first matching function name in a respective call-stack trace pair;

using said computer, for each non-matching call-stack trace pair, incrementing a false positive counter for each function name above a first non-matching function name in a respective call-stack pair;

using said computer, incrementing a frequency counter for each function name appearing in each of said call-stack traces;

using said computer, calculating an aggregate value for each of said function names as a function of respective ones of said false positive counter, said false negative counter and said frequency counter; and using said computer, identifying uninformative ones of said function names based on the respective aggregate values.

2. The method of claim 1, wherein said uninformative function names are identified based on a comparison of said aggregate values to a threshold value.

3. The method of claim 1, wherein said uninformative function names are identified based on a comparison of said aggregate values.

4. The method of claim 1, wherein said set of call-stack traces and said information indicative of which call-stack traces in said set match a particular call-stack trace are obtained from a repository of known software problems based on an index and a match ranking score associated with each said particular call-stack trace which exceeds a threshold ranking score.

5. The method of claim 1, wherein call-stack traces in a matching call-stack trace pair both relate to a common software problem.

6. The method of claim 1, wherein call-stack traces in a non-matching call-stack trace pair relate to different software problems.

7. The method of claim 1, comprising the step of incrementing said false positive counter for each function name in a pair of identical call-stack traces.

8. The method of claim 1, comprising the step of incrementing said false negative counter for each function name in a pair of call-stack traces that have no matching function names.

9. The method of claim 1, wherein said aggregate values are calculated in accordance with the formulae:

$$F_f = w_1 * FPC_f + w_2 * FNC_f + w_3 * FC_f;$$

wherein:
$F_f$ is an aggregate value relating to whether function name $f$ is an uninformative function;
$FPC_f$ is a false positive counter for function name $f$;
$FNC_f$ is a false negative counter for function name $f$;
$FC_f$ is a frequency counter for function name $f$; and
$w_1$, $w_2$, and $w_3$ are weight values.

10. The method of claim 9, wherein said weights are determined in accordance with a penalty incurred by the system based on said false positive as compared to a penalty incurred by the system based on said false negative.

11. The method of claim 9, wherein said weights are determined in accordance with the formulae:

$$w_1 = 1/SUM(FPC);$$

$$w_2 = 1/SUM(FNC); \text{ and}$$

$$w_3 = 1/SUM(FC).$$

12. The method of claim 9, wherein said weights are determined in accordance with the formulae:

$$w_1 = 1/FPC_{max};$$

$$w_2 = 1/FNC_{max}; \text{ and}$$

$$w_3 = 1/FC_{max}.$$

13. A computer system for identifying names of uninformative functions in call-stack traces, said system comprising:
a repository for storing call-stack traces relating to known software problems; and
a computer system coupled to said repository, said computer system comprising a memory unit for storing data and instructions to be performed by a processing unit and a processing unit coupled to said memory unit, said processing unit programmed to:
obtain, from said repository, a set of call-stack traces and information indicative of which call-stack traces in said set match a particular call-stack trace;
for each matching call-stack trace pair, increment a false negative counter for each function name above a first matching function name in a respective call-stack trace pair;
for each non-matching call-stack trace pair, increment a false positive counter for each function name above a first non-matching function name in a respective call-stack trace pair;
increment a frequency counter for each function name appearing in each of said call-stack traces;
calculate an aggregate value for each of said function names as a function of respective ones of said false positive counter, said false negative counter and said frequency counter; and
identify uninformative ones of said function names based on the respective aggregate values.

14. The computer system of claim 13, wherein said processing unit is further programmed to increment said false positive counter for each function name in a pair of identical call-stack traces.

15. The computer system of claim 13, wherein said processing unit is further programmed to increment said false negative counter for each function name in a pair of call-stack traces that have no matching function names.

16. The computer system of claim 13, wherein said processing unit is programmed to calculate said aggregate values in accordance with the formula:

$$F_f = w_1 * FPC_f + w_2 * FNC_f + w_3 * FC_f;$$

wherein:
$F_f$ is an aggregate value relating to whether function name $f$ is an uninformative function;
$FPC_f$ is a false positive counter for function name $f$;
$FNC_f$ is a false negative counter for function name $f$;
$FC_f$ is a frequency counter for function name $f$; and
$w_1$, $w_2$, and $w_3$ are weight values.

17. A computer program product comprising a computer readable medium comprising a computer program recorded therein for identifying names of uninformative functions in call-stack traces, said computer program product comprising:
computer program code for obtaining a set of call-stack traces and information indicative of which call-stack traces in said set match a particular call-stack trace;
computer program code for, for each matching call-stack trace pair, incrementing a false negative counter for each function name above a first matching function name in a respective call-stack trace pair;
computer program code for, for each non-matching call-stack trace pair, incrementing a false positive counter for each function name above a first non-matching function name in a respective call-stack trace pair;
computer program code for incrementing a frequency counter for each function name appearing in each of said call-stack traces;
computer program code for calculating an aggregate value for each of said function names as a function of respective ones of said false positive counter, said false negative counter and said frequency counter; and
computer program code for identifying uninformative ones of said function names based on the respective aggregate values.

18. The computer program product of claim 17, further comprising computer program code for incrementing said false positive counter for each function name in a pair of identical call-stack traces.

19. The computer program product of claim 17, further comprising computer program code for incrementing said false negative counter for each function name in a pair of call-stack traces that have no matching function names.

20. The computer program product of claim 17, further comprising computer program code for calculating said aggregate values in accordance with the formula:

$$F_f = w_1 * FPC_f + w_2 * FNC_f + w_3 * FC_f;$$

wherein:
$F_f$ is an aggregate value relating to whether function name f is an uninformative function;
$FPC_f$ is a false positive counter for function name $f$;
$FNC_f$ is a false negative counter for function name $f$;
$FC_f$ is a frequency counter for function name $f$; and
$w_1$, $w_2$, and $w_3$ are weight values.

21. The method of claim 1, wherein said aggregate values comprise probability values.

22. The computer system of claim 13, wherein said aggregate values comprise probability values.

23. The computer program product of claim 17, wherein said aggregate values comprise probability values.

* * * * *